US009362536B2

(12) United States Patent
Niedzwiecki et al.

(10) Patent No.: US 9,362,536 B2
(45) Date of Patent: Jun. 7, 2016

(54) OPTIMIZED MODULE RESTRAINT SYSTEM

(75) Inventors: Mark A. Niedzwiecki, Troy, MI (US);
Nick Karditsas, Lake Orion, MI (US)

(73) Assignee: Robert Bosch GmbH, Stuttgart (DE)

( * ) Notice: Subject to any disclaimer, the term of this patent is extended or adjusted under 35 U.S.C. 154(b) by 930 days.

(21) Appl. No.: 13/542,804

(22) Filed: Jul. 6, 2012

(65) Prior Publication Data

US 2013/0288105 A1 Oct. 31, 2013

Related U.S. Application Data

(60) Provisional application No. 61/638,144, filed on Apr. 25, 2012.

(51) Int. Cl.
| | | |
|---|---|---|
| *H01M 2/10* | (2006.01) | |
| *H01M 10/04* | (2006.01) | |
| H01M 10/052 | (2010.01) | |
| H01M 10/48 | (2006.01) | |
| H01M 10/6572 | (2014.01) | |
| H01M 10/655 | (2014.01) | |

(52) U.S. Cl.
CPC ........ *H01M 2/1077* (2013.01); *H01M 10/0481* (2013.01); *H01M 2/1083* (2013.01); *H01M 10/052* (2013.01); *H01M 10/482* (2013.01); *H01M 10/655* (2015.04); *H01M 10/6572* (2015.04); *H01M 2220/20* (2013.01); *Y02T 10/7011* (2013.01)

(58) Field of Classification Search
CPC ............. H01M 2/1061–2/1066; H01M 2/1077
USPC ....................................................... 429/159
See application file for complete search history.

(56) References Cited

U.S. PATENT DOCUMENTS

| | | | | |
|---|---|---|---|---|
| 5,663,008 | A * | 9/1997 | Shimakawa et al. | 429/443 |
| 6,218,042 | B1 | 4/2001 | Naudet et al. | |
| 2008/0280194 | A1 * | 11/2008 | Okada | 429/99 |
| 2008/0318119 | A1 * | 12/2008 | Watanabe et al. | 429/99 |
| 2009/0142653 | A1 * | 6/2009 | Okada | H01M 2/1077 429/120 |
| 2010/0167116 | A1 * | 7/2010 | Okada | 429/158 |

(Continued)

FOREIGN PATENT DOCUMENTS

| | | |
|---|---|---|
| EP | 2439810 A2 | 4/2012 |
| FR | 2737807 A3 | 2/1997 |

(Continued)

OTHER PUBLICATIONS

International Search Report and Written Opinion corresponding to PCT Application No. PCT/US2013/037730, mailed Oct. 11, 2013 (18 pages).

*Primary Examiner* — Barbara Gilliam
*Assistant Examiner* — Robert S Carrico
(74) *Attorney, Agent, or Firm* — Maginot Moore & Beck LLP

(57) ABSTRACT

A battery module according to the principles of the present disclosure includes a plurality of battery cells, a pair of sideplates, and a pair of endplates. The sideplates are disposed on opposite sides of the plurality of battery cells and the endplates are disposed at opposite ends of the battery module. The sideplates include a first mating portion and the endplates include a second mating portion that engages the first mating portion to provide an interference fit. The interference fit joins the sideplates and the endplates together and bands the plurality of cells together between the sideplates and the endplates.

14 Claims, 6 Drawing Sheets

(56) References Cited

U.S. PATENT DOCUMENTS

2010/0285347 A1* 11/2010 Saito et al. ............... 429/120
2012/0009447 A1* 1/2012 Ikeda ............. H01M 2/1077
                429/90
2012/0064379 A1* 3/2012 Oguri et al. ............... 429/56

2012/0282515 A1* 11/2012 Kim .......................... 429/159

FOREIGN PATENT DOCUMENTS

WO WO 2009022521 A1 * 2/2009 ......... H01M 2/1077
WO   2012043594 A1  4/2012

* cited by examiner

OPTIMIZED MODULE RESTRAINT SYSTEM

CROSS-REFERENCE TO RELATED APPLICATIONS

This application claims the benefit of U.S. Provisional Application No. 61/638,144, filed on Apr. 25, 2012. The disclosure of the above application is incorporated herein by reference in its entirety.

FIELD

The present disclosure relates to batteries for vehicles and more specifically to battery modules including structures for retaining a plurality of electrochemical cells.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electric vehicles (EVs), hybrid electric vehicles (HEVs) and plug-in HEVs use multiple propulsion systems to provide motive power. The propulsion systems include electric systems that receive power from a battery pack. A battery pack includes one or more battery modules, and a battery module includes a plurality of high-voltage cells (or batteries) such as lithium ion cells. The cells are electrically connected to one another and mechanically linked together to form a self-supporting assembly.

Battery modules have been developed that include stainless steel endplates and sideplates. The endplates and sideplates are placed around a plurality of cells and are laser welded to each other to band the cells together. However, the cost and mass of stainless steel is relatively high, and the module is not serviceable once the endplates and sideplates are welded together. In addition, it is difficult to inspect the quality of the laser welds between the endplates and sideplates without destructive testing.

SUMMARY

A battery module according to the principles of the present disclosure includes a plurality of battery cells, a pair of sideplates, and a pair of endplates. The sideplates are disposed on opposite sides of the plurality of battery cells and the endplates are disposed at opposite ends of the battery module. The sideplates include a first mating portion and the endplates include a second mating portion that engages the first mating portion to provide an interference fit. The interference fit joins the sideplates and the endplates together and bands the plurality of cells together between the sideplates and the endplates.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5A is a section view of the battery modules of FIG. 4 taken along line 5A-5A shown in FIG. 4.

DETAILED DESCRIPTION

A battery module according to the principles of the present disclosure may include high-strength steel endplates and plastic sideplates. The endplates and sideplates may include a snap feature that allows the endplates and sideplates to snap together, and thereby eliminate the need for fasteners or a mechanical joining process. The snap feature may be referred to as a detent, catch, or stop, and may include a ramped projection molded into the sideplates. The endplates may include flanges that wrap around the sideplates, and the flanges may define slots that receive the ramped projection.

When the battery module is assembled, a person may position the sideplates on opposite sides of high-voltage cells using fixtures. The person may then slide the endplates over the sideplates. As the person slides the endplates over the ramped projections on the sideplates, the flanges of the endplates deflect outward until the ramped projections are received into the slots in the flanges. At that point, the flanges snap back to their original positions to lock the endplates in place. Once the snap features engage, the cells are held in place by compression and frictional sliding forces.

The cost and mass of high-strength steel endplates and plastic sideplates is less than the cost and mass of stainless steel endplates and sideplates. In addition, joining the endplates and sideplates using snap features instead of laser welding the endplates to the sideplates is a simpler process that does not require equipment such as a robot and a laser. To further reduce cost, common endplates (front to back) and common sideplates (left to right) may be used. Overall, the cost and mass of the battery module may be approximately 40 percent less than that of a battery module which includes stainless steel endplates and sideplates that are laser welded together.

Figure 1:
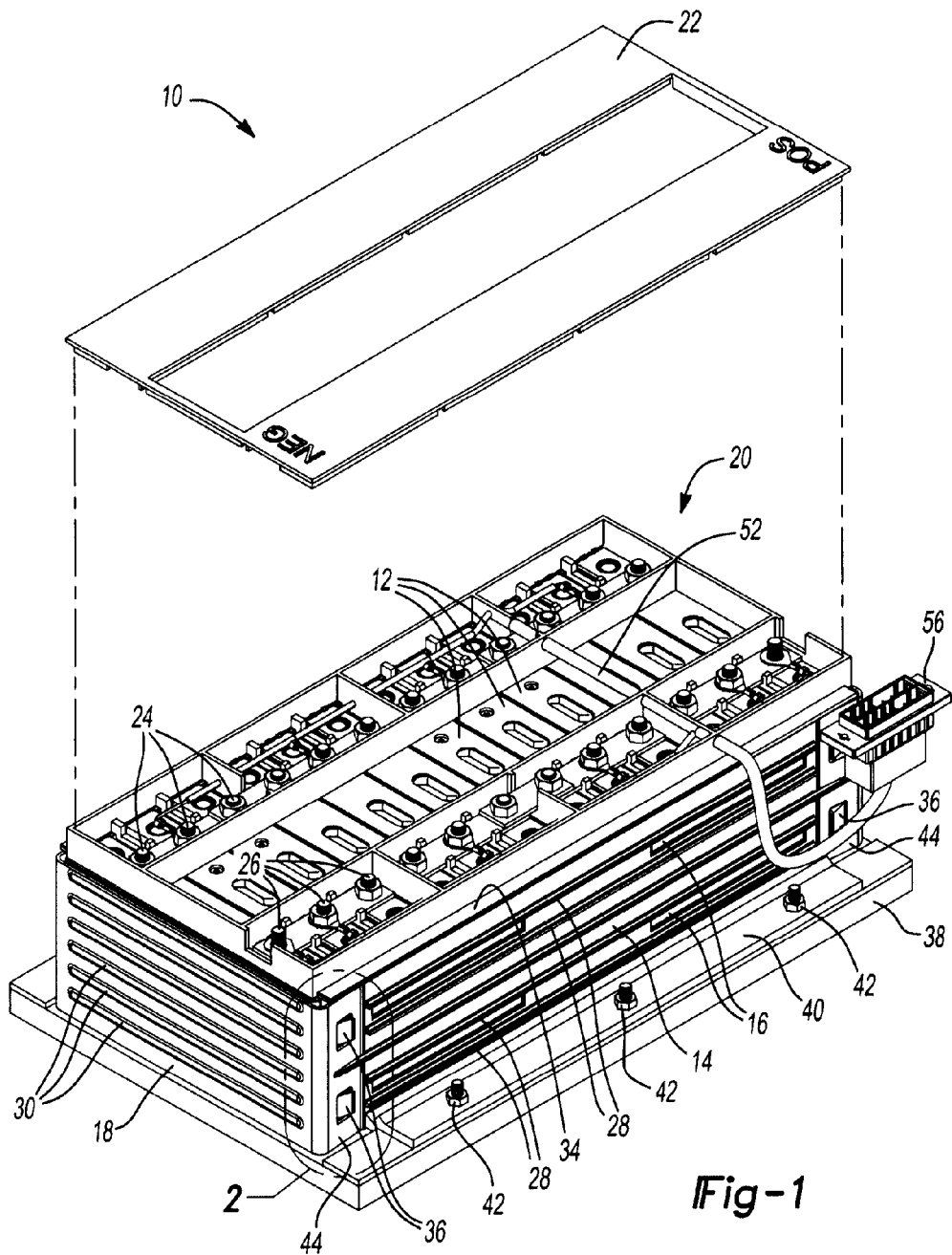
FIG. 1 is a perspective view of a battery module with a terminal cover of the battery module disassembled from the remainder of the battery module.
Figure 2:
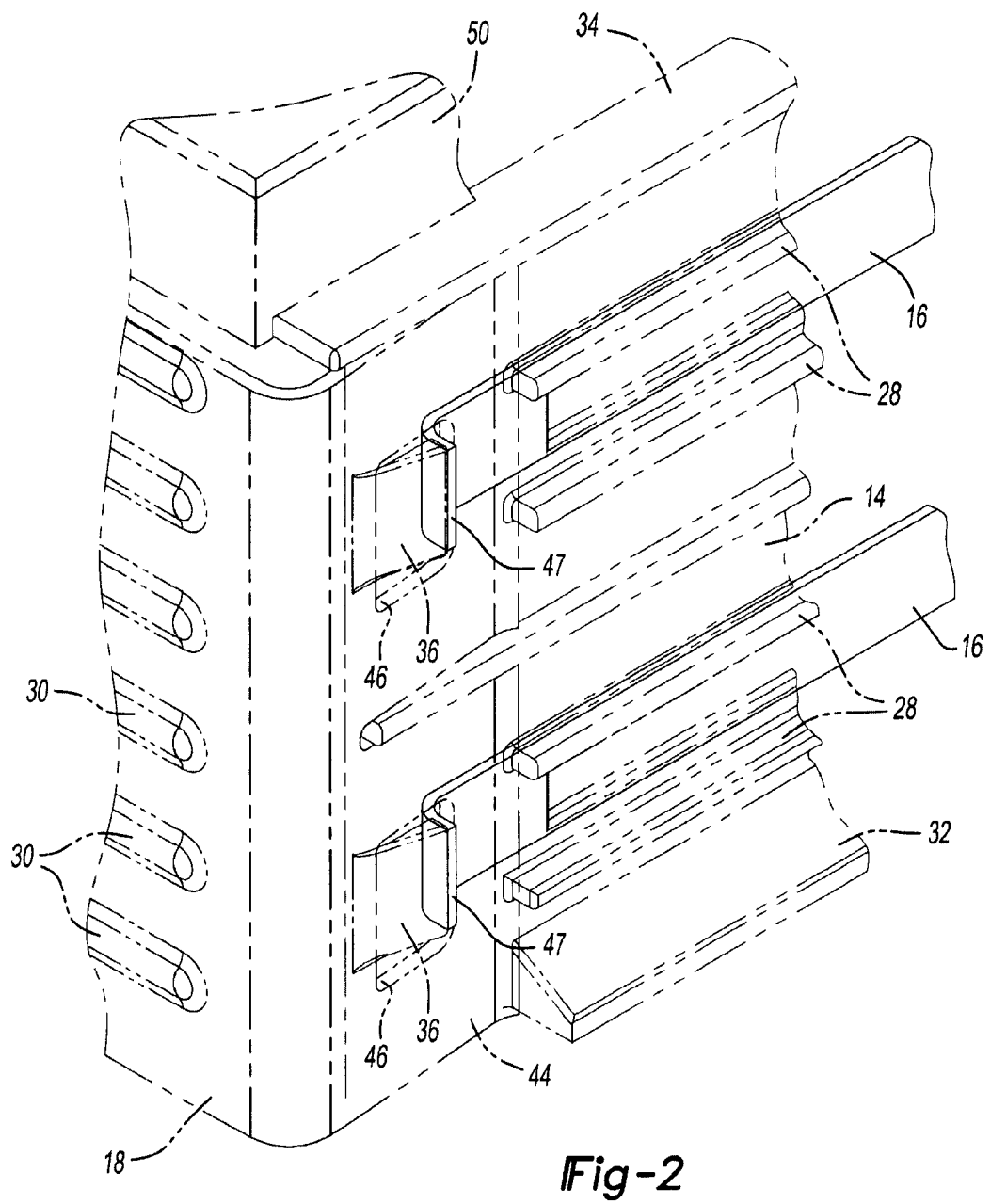
FIG. 2 is a perspective view of a portion of the battery module of FIG. 1 within circle 2 shown in FIG. 1.
Figure 3:
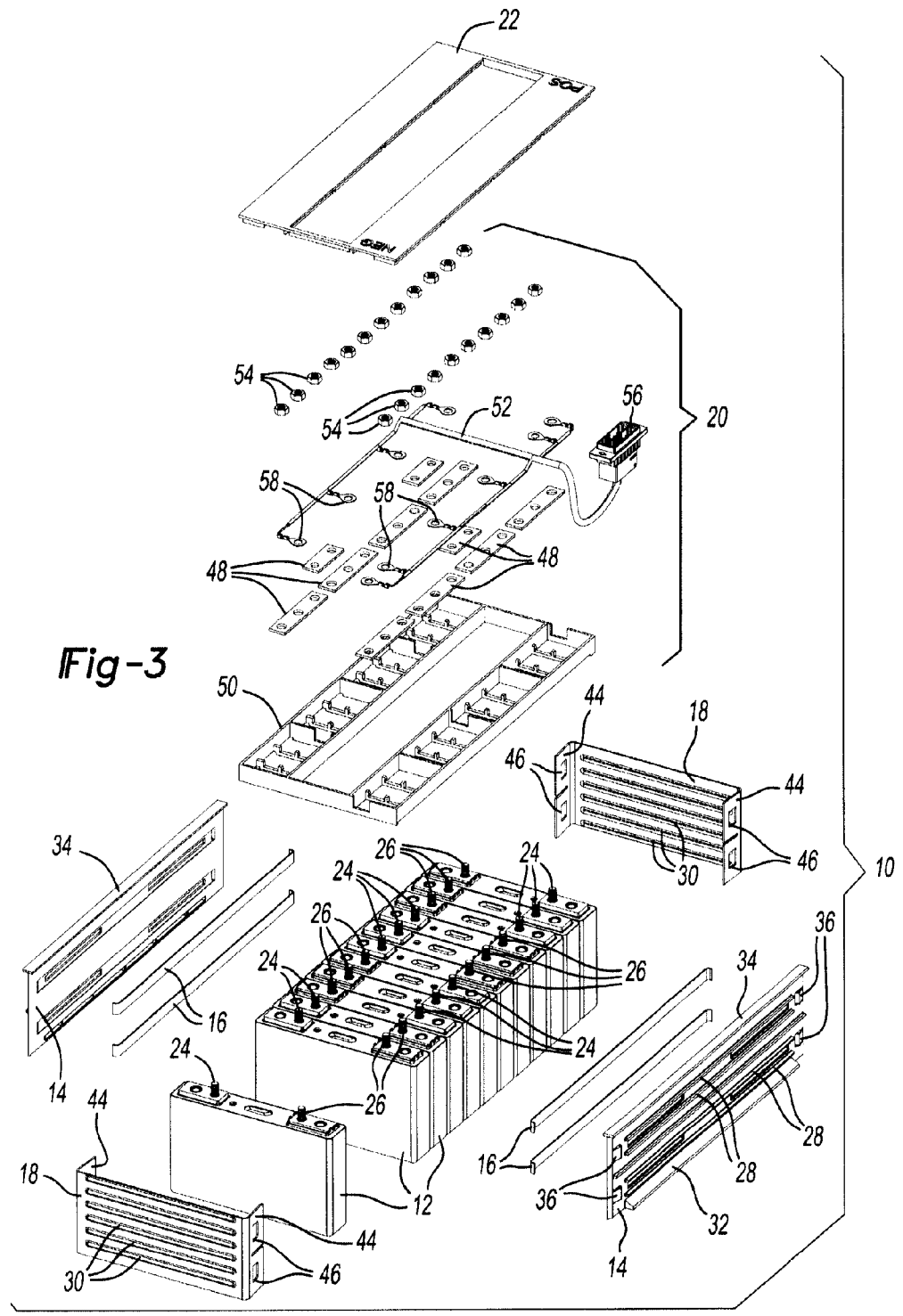
FIG. 3 is an exploded perspective view of the battery module of FIG. 1.

Referring now to FIGS. 1 through 3, a battery module 10 includes a plurality of cells 12, sideplates 14, sideplate inserts 16, endplates 18, an interconnect assembly 20, and a terminal cover 22. The cells 12 may be high-voltage cells (or batteries) such as lithium ion cells. The cells 12 include first terminals 24 and second terminals 26. The first terminals 24 may be positive and the second terminals 26 may be negative, or the first terminals 24 may be negative and the second terminals 26 may be positive. Although the battery module 10 is depicted as including twelve of the cells 12, the battery module 10 may include additional or fewer cells.

The cells 12 are compressed and banded together using the sideplates 14 and the endplates 18. The sideplates 14 may be formed (e.g., molded) from plastic. The inserts 16 and the endplates 18 may be formed (e.g., stamped) from metal (e.g., high-strength steel). The sideplates 14 include stiffening ribs 28, and the endplates 18 include stiffening ribs 30. The inserts 16 are positioned between adjacent pairs of the ribs 28. The ribs 28, 30 and the inserts 16 enable the sideplates 14 and the endplates 18 to restrict swelling or bowing of the cells 12 during service.

The sideplates 14 further include ramped bases 32, lips 34, and ramped projections 36. The ramped bases 32 may be used to secure the battery module 10 in the vertical direction. As shown in FIG. 1, when the battery module 10 is installed in a vehicle, the battery module 10 may be placed on a base tray 38 and clamp bars 40 may be placed over the ramped bases 32 and fixed to the base tray 38. The clamp bars 40 may be fixed to the base tray 38 using fasteners 42. The lips 34 on the sideplates 14 extend over the top of the cells to prevent the cells 12 from moving vertically during shock or vibration events.

A cooling plate (not shown) may be used in place of the base tray 38. The cooling plate may be electrically cooled or cooled using coolant. In addition, a thermal interface material such as thermal grease may be inserted between the cooling plate and the cells 12 to improve heat transfer therebetween.

The endplates 18 include angled flanges 44 that wrap around the sideplates 14 when the endplates 18 are assembled to the sideplates 14. The flanges 44 may extend perpendicularly from the remainder of the endplates 18. The flanges 44 define slots 46 that receive the ramped projections 36 on the sideplates 14. The endplates 18 may be coated with electrically insulating material using electrophoretic deposition.

During assembly, a person may position the sideplates 14 on opposite sides of the cells 12 using fixtures. The person may then slide the endplates 18 over the sideplates 14. As the person slides the endplates 18 over the ramped projections 36 on the sideplates 14, the flanges 44 of the endplates 18 deflect outward until the ramped projections 36 are received into the slots 46 in the flanges 44. At that point, the flanges 44 snap back to their original positions to lock the endplates 18 in place.

As best shown in FIG. 2, the inserts 16 include angled tabs 47 that extend through the slots 46 in the endplates 18 when the inserts 16 are assembled to the sideplates 14 and the endplates 18. The tabs 47 may extend perpendicularly from the remainder of the inserts 16. The tabs 47 are held between the ramped projections 36 on the sideplates 14 and the slots 46 in the endplates 18. Thus, the inserts 16 counteract tension forces that may be applied to the sideplates 14 as the cells 12 swell due to charging and/or aging. In addition, the ribs 28, the ramped projections 36, and the slots 46 engage the inserts 16 to hold the inserts 16 in place.

The interconnect assembly 20 electrically connects the first terminals 24 and the second terminals 26 to one another. The interconnect assembly 20 includes bus bars 48, a bus bar carrier 50, a wiring harness 52, and terminal nuts 54. The wiring harness 52 includes a main connector 56 and terminal connectors 58.

During assembly, the bus bar carrier 50 is positioned on top of the cells 12 around the first terminals 24 and the second terminals 26. The bus bars 48 are placed over the first terminals 24 and the second terminals 26, and the terminal connectors 58 of the wiring harness 52 are placed over the bus bars 48. The terminal nuts 54 are threaded onto the first terminals 24 and the second terminals 26 to secure the bus bars 48 and the terminal connectors 58 to the first terminals 24 and the second terminals 26. The terminal cover 22 is then placed over the first terminals 24 and the second terminals 26 to electrically insulate the first terminals 24 and the second terminals 26.

Figure 4:
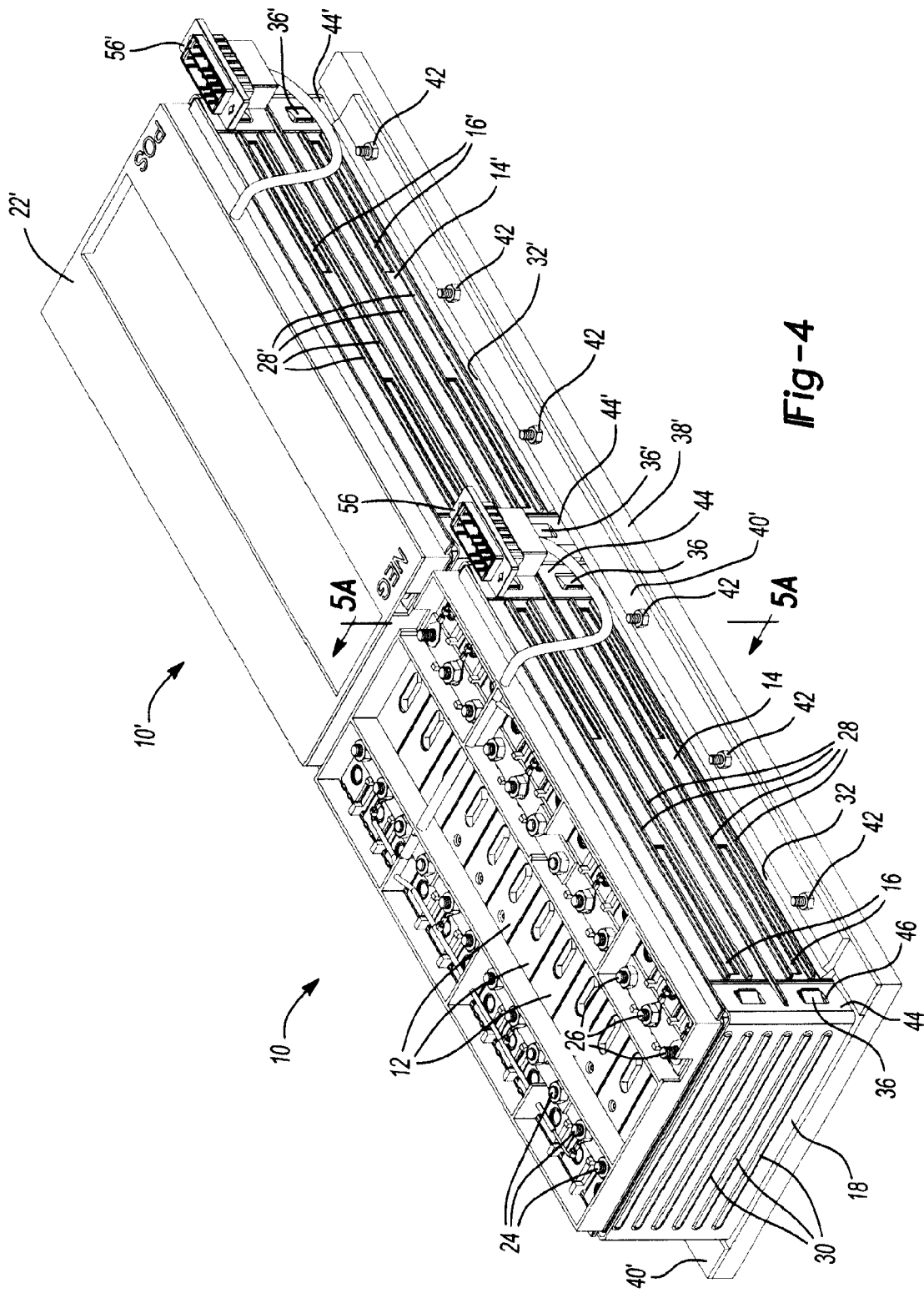
FIG. 4 is a perspective view of two battery modules aligned end-to-end and secured to a base tray.
Figure 5:
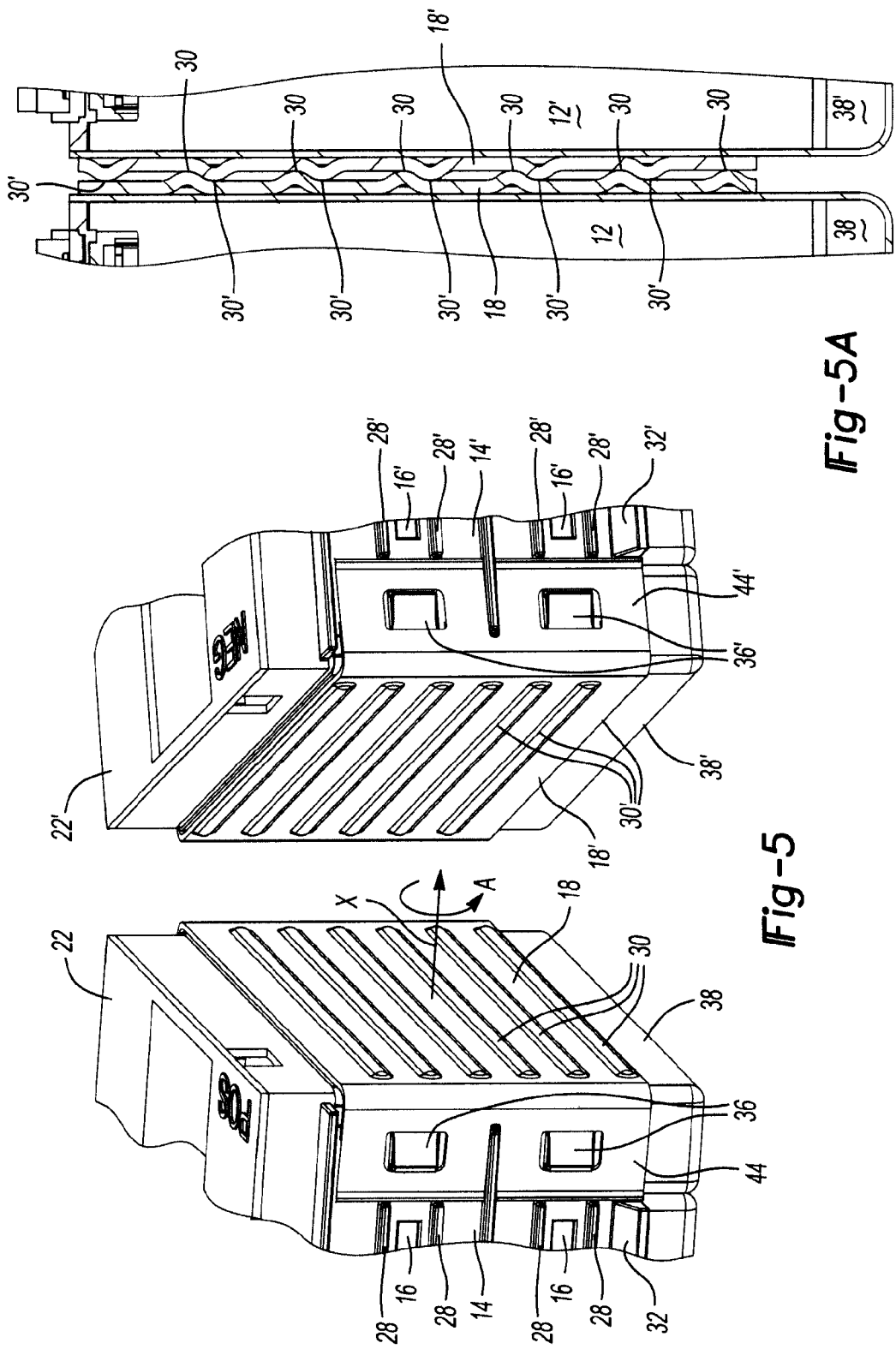
FIG. 5 is a perspective view of portions of the battery modules of FIG. 4 rotated to illustrate ribs in endplates of the battery modules that nest together.

Referring now to FIGS. 4, 5, and 5A, the battery module 10 is shown positioned end-to-end with a battery module 10' that is similar to the battery module 10. The base tray 38 and the clamp bar 40 have been replaced with a base tray 38' and a clamp bar 40' that is sized to secure two battery modules positioned end-to-end. Although two battery modules are shown, a battery pack for a vehicle may include only one battery module or more than two battery modules positioned end-to-end.

As best shown in FIGS. 5 and 5A, the ribs 30, 30' of the battery modules 10, 10' are configured to allow the battery modules 10, 10' to be placed end-to-end without losing space for the ribs 30, 30'. The ribs 30 of the endplate 18 are offset from the ribs 30' of the endplate 18 so that the ribs 30, 30' of the endplates 18, 18' are nested together as shown in FIG. 5A when the battery modules 10, 10' are positioned end-to-end. If the ribs 30, 30' are not offset relative to one another as shown in FIG. 5A, one of the endplates 18, 18' may be rotated 180 degrees about the longitudinal axis X of the battery module 10 in the direction of arrow A to offset the ribs 30, 30' as shown.

Figure 6:
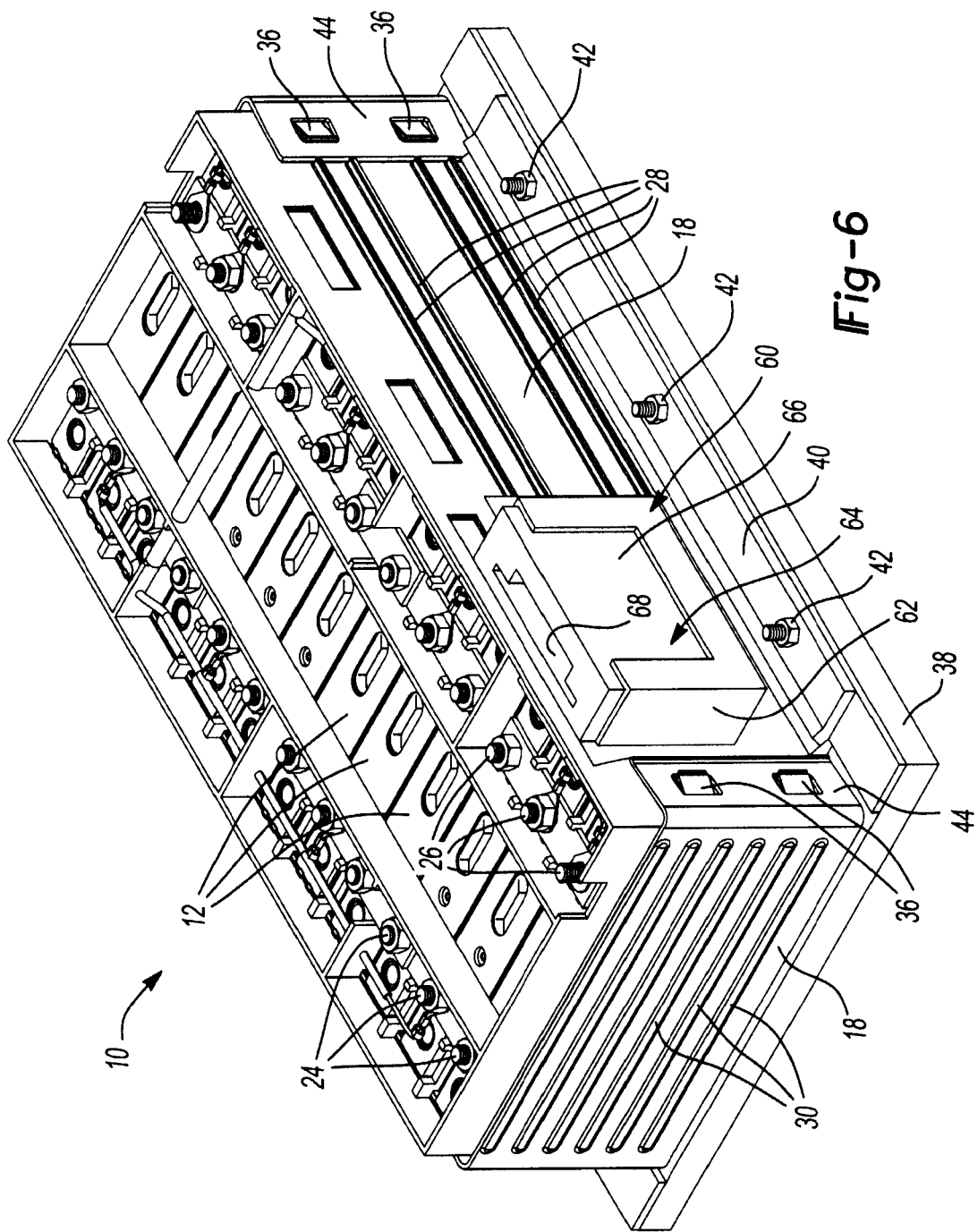
FIG. 6 is a perspective view of a battery module with a portion of a sideplate of the battery module removed to show a retaining feature extending from the sideplate.

Referring now to FIG. 6, the sideplates 14 may include one or more retaining features that retain auxiliary components such as a high-voltage cable, a wiring harness, a cell supervisory circuit (CSC), and/or cooling tubes or hoses. FIG. 6 shows a retaining feature 60 that includes walls 62 extending inward from one of the sideplates 14 to secure a CSC 64. The CSC 64 measures the open-circuit voltage of each of the cells 12 and includes an enclosure that houses a printed circuit board (PCB) 68 therein.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR.

What is claimed is:

1. A battery comprising:
   a plurality of battery cells;
   a first sideplate disposed on a first side of the plurality of battery cells and including first and second ramped projections extending away from the plurality of battery cells;
   a second sideplate disposed on a second opposite side of the plurality of battery cells and including third and fourth ramped projections extending away from the plurality of battery cells;
   a first endplate disposed at a first end of the battery module and including first and second flanges extending partially over the first and second sideplates, respectively, and defining first and second slots that engage the first and third ramped projections, respectively, to join the first endplate to the first and second sideplates; and
   a second endplate disposed at a second opposite end of the battery module and including third and fourth flanges extending partially over the first and second sideplates, respectively, and defining third and fourth slots that engage the second and fourth ramped projections, respectively, to join the second endplate to the first and second sideplates so as to band the plurality of cells together between the first and second sideplates and the first and second endplates, wherein:
the first and second sideplates are formed entirely of plastic and the first and second endplates are formed of metal,
each of the first and second sideplates includes a plurality of stiffening ribs
the battery module further comprises:
a first insert disposed between a first adjacent pair of the stiffening ribs of the first sideplate, the first insert having a first end connected to the first endplate and a second end connected to the second endplate; and
a second insert disposed between a second adjacent pair of the stiffening ribs of the second sideplate, the second insert having a third end connected to the first endplate and a fourth end connected to the second endplate,
the first end of the first insert includes a first angled tab held between the first ramped projection and the first slot,
the second end of the first insert includes a second angled tab held between the second ramped projection and the third slot,
the third end of the second insert includes a third angled tab held between the third ramped projection and the second slot, and
the fourth end of the second insert includes a fourth angled tab held between the fourth ramped projection and the fourth slot.

2. The battery module of claim 1, wherein the first and second sideplates and the first and second endplates are joined together solely by the engagement between the first, second, third, and fourth ramped projections with the first, third, second, and fourth slots, respectively.

3. The battery module of claim 1, wherein the first, second, third, and fourth flanges are configured to deflect outwardly as the first, second, third, and fourth flanges are slid over the first, third, second, and fourth ramped projections, respectively, until the first, third, second, and fourth ramped projections are received into the first, third, second, and fourth slots, respectively.

4. The battery module of claim 1, further comprising:
a third insert disposed between a third adjacent pair of the stiffening ribs of the first sideplate, the third insert having a fifth end connected to the first endplate and a sixth end connected to the second endplate, and
a fourth insert disposed between a fourth adjacent pair of the stiffening ribs of the second sideplate, the fourth insert having a seventh end connected to the first endplate and an eighth end connected to the second endplate.

5. The battery module of claim 1, wherein the first and second inserts are formed from metal.

6. The battery module of claim 1, wherein the first and second endplates include stiffening ribs.

7. A battery system comprising at least two of the battery modules of claim 6, wherein the stiffening ribs on adjacent ones of the endplates are configured to nest together when the battery modules are positioned end-to-end.

8. The battery module of claim 7, wherein the stiffening ribs on adjacent ones of the endplates are offset from one another.

9. The battery module of claim 1, wherein the first and second sideplates each include a retaining feature that retains an auxiliary component.

10. The battery module of claim 9, wherein the auxiliary component is a cell supervisory circuit that measures an open-circuit voltage of the plurality of cells.

11. The battery module of claim 1, wherein the first and second sideplates each include a lip that engages top surfaces of the plurality of cells to retain the plurality of cells in a vertical direction.

12. The battery module of claim 11, wherein the first and second sideplates each include ramped bases.

13. A battery system comprising:
the battery module of claim 12;
a base tray on which the battery module is placed; and
a plurality of clamp bars placed over the ramped bases of the first and second sideplates and fixed to the base tray so as to retain the battery module in a fixed position on the base tray.

14. A battery module comprising:
a plurality of battery cells;
a pair of sideplates disposed on opposite sides of the plurality of battery cells, wherein the sideplates include ramped projections and stiffening ribs;
a pair of endplates disposed at opposite ends of the battery module, wherein the endplates include flanges defining slots that receive the ramped projections on the sideplates to join the endplates to the sideplates and band the plurality of cells together between the sideplates and the endplates; and
a plurality of inserts disposed between adjacent pairs of the stiffening ribs, wherein each of the plurality of inserts has a first end and a second end, the first ends are held between the ramped projections on one of the sideplates and the slots in the flanges of one of the endplates, and the second ends are held between the ramped projections on the other one of the sideplates and the slots in the flanges of the other one of the endplates.

* * * * *